United States Patent
Neander et al.

(10) Patent No.: US 11,346,149 B2
(45) Date of Patent: May 31, 2022

(54) INSULATING GLAZING, WINDOW AND PRODUCTION METHOD

(71) Applicant: SAINT-GOBAIN GLASS FRANCE, Courbevoie (FR)

(72) Inventors: Marcus Neander, Eschweiler (DE); Christopher Marjan, Aachen (DE); Hans-Werner Kuster, Aachen (DE); Bryan Greer, Northfield, MN (US); Guenael Morvan, Marseilles (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 14 days.

(21) Appl. No.: 16/964,074

(22) PCT Filed: Jan. 8, 2019

(86) PCT No.: PCT/EP2019/050274
§ 371 (c)(1),
(2) Date: Jul. 22, 2020

(87) PCT Pub. No.: WO2019/141533
PCT Pub. Date: Jul. 25, 2019

(65) Prior Publication Data
US 2021/0047879 A1     Feb. 18, 2021

Related U.S. Application Data

(60) Provisional application No. 62/620,102, filed on Jan. 22, 2018.

(30) Foreign Application Priority Data

Feb. 22, 2018 (EP) .................................... 18158003

(51) Int. Cl.
*E06B 3/663* (2006.01)
*B32B 17/10* (2006.01)
(Continued)

(52) U.S. Cl.
CPC .... *E06B 3/66366* (2013.01); *B32B 17/10513* (2013.01); *E06B 3/673* (2013.01);
(Continued)

(58) Field of Classification Search
CPC ... B32B 17/10513; E06B 3/663; E06B 3/673; E06B 3/6722; E06B 3/66366; E06B 9/24; E06B 2009/2464; G02F 1/153
See application file for complete search history.

(56) References Cited

U.S. PATENT DOCUMENTS

| | | | |
|---|---|---|---|
| 4,691,486 A | | 9/1987 | Niekrasz et al. |
| 5,531,047 A | * | 7/1996 | Leopold .................. B29C 48/05 52/172 |

(Continued)

FOREIGN PATENT DOCUMENTS

| | | | | |
|---|---|---|---|---|
| CA | 2279479 A1 | * | 1/2000 | ......... E06B 3/66319 |
| CA | 2416264 A1 | | 1/2002 | |

(Continued)

OTHER PUBLICATIONS

International Search Report as issued in International Patent Application No. PCT/EP2019/050274, dated Apr. 15, 2019.

*Primary Examiner* — Jessie T Fonseca
(74) *Attorney, Agent, or Firm* — Pillsbury Winthrop Shaw Pittman LLP (57) ABSTRACT

An insulating glazing, in particular a triple glazing or a multiple glazing, with at least one first pane element, at least one spacer, and at least one connector, wherein the spacer and the connector are arranged next to each other such that they extend along a common longitudinal axis, wherein the spacer and the connector accommodate and position the first pane element. An electrically conductive coupling element is provided in the receiving groove of the connector such that an electrical coupling can be established between the (Continued)

connector and the first pane element for electrically connecting an external power source to the first pane element.

15 Claims, 4 Drawing Sheets

(51) Int. Cl.
    *E06B 3/67*     (2006.01)
    *E06B 3/673*     (2006.01)
    *G02F 1/153*     (2006.01)
    *E06B 9/24*     (2006.01)

(52) U.S. Cl.
    CPC .............. *E06B 3/6722* (2013.01); *E06B 9/24* (2013.01); *G02F 1/153* (2013.01); *E06B 3/663* (2013.01); *E06B 2009/2464* (2013.01)

(56) References Cited

U.S. PATENT DOCUMENTS

| | | | | |
|---|---|---|---|---|
| 5,553,440 | A * | 9/1996 | Bulger | E06B 3/66309 52/172 |
| 6,115,989 | A * | 9/2000 | Boone | E06B 3/66366 52/786.13 |
| 2012/0026573 | A1 | 2/2012 | Collins et al. | |
| 2012/0141699 | A1* | 6/2012 | Mader | E06B 3/66366 428/34 |
| 2016/0208544 | A1* | 7/2016 | Nieminen | E06B 7/16 |
| 2017/0045795 | A1 | 2/2017 | Brown et al. | |

FOREIGN PATENT DOCUMENTS

| | | | | |
|---|---|---|---|---|
| DE | 69721175 T2 | | 5/2004 | |
| DE | 202012011040 U1 * | | 12/2012 | ................ E06B 5/11 |
| EA | 28594 B1 | | 12/2017 | |
| EP | 0 876 608 B1 | | 4/2002 | |
| EP | 2 322 984 A1 | | 5/2011 | |
| EP | 3702572 A1 * | | 9/2020 | ......... E06B 3/66366 |
| FR | 2981929 A1 * | | 5/2013 | ............. H01Q 1/246 |
| FR | 3057900 A1 * | | 4/2018 | ......... C03C 17/3639 |
| FR | 3084391 A1 * | | 1/2020 | ......... E06B 3/66366 |
| JP | 4642947 B2 * | | 3/2011 | ........... E06B 3/6715 |
| JP | 2013-186396 A | | 9/2013 | |
| JP | 2017-105664 A | | 6/2017 | |
| JP | 6174220 B1 | | 8/2017 | |
| KR | 20130003223 A * | | 1/2013 | |
| KR | 101261789 B1 * | | 5/2013 | |
| KR | 20160007593 A * | | 1/2016 | ......... E06B 3/67326 |
| RU | 2394976 C1 * | | 7/2010 | ......... E06B 3/66366 |
| RU | 2531063 C2 | | 10/2014 | |
| WO | WO-9633334 A1 * | | 10/1996 | ....... B32B 17/10302 |
| WO | WO-9939072 A1 * | | 8/1999 | ......... E06B 3/66366 |
| WO | WO 00/58580 A1 | | 10/2000 | |
| WO | WO-2010115456 A1 * | | 10/2010 | ......... E06B 3/66366 |
| WO | WO 2011/033313 A1 | | 3/2011 | |
| WO | WO-2011088994 A2 * | | 7/2011 | ........... E06B 3/6621 |
| WO | WO 2012/007334 A1 | | 1/2012 | |
| WO | WO 2012/078634 A2 | | 6/2012 | |
| WO | WO-2015152011 A1 * | | 10/2015 | ......... E06B 3/66309 |
| WO | WO-2015197491 A1 * | | 12/2015 | ................ B32B 3/08 |
| WO | WO-2016091646 A1 * | | 6/2016 | ......... E06B 3/66347 |
| WO | WO-2016091648 A1 * | | 6/2016 | ......... E06B 3/66366 |
| WO | WO-2016121332 A1 * | | 8/2016 | ................ E06B 9/24 |
| WO | WO 2017/106458 A1 | | 6/2017 | |
| WO | WO-2017207192 A1 * | | 12/2017 | ........... E06B 3/6617 |
| WO | WO-2018050357 A1 * | | 3/2018 | ......... E06B 3/66319 |
| WO | WO-2018137924 A1 * | | 8/2018 | ............. E06B 3/667 |
| WO | WO-2019141700 A1 * | | 7/2019 | ......... E06B 3/67326 |
| WO | WO-2019141749 A1 * | | 7/2019 | ......... E06B 3/66314 |
| WO | WO-2020007638 A1 * | | 1/2020 | ......... E06B 3/66319 |
| WO | WO-2020021198 A1 * | | 1/2020 | ........... E06B 3/7017 |

* cited by examiner

INSULATING GLAZING, WINDOW AND PRODUCTION METHOD

CROSS-REFERENCE TO RELATED APPLICATIONS

This application is the U.S. National Stage of PCT/EP2019/050274, filed Jan. 8, 2019, which in turn claims priority to U.S. provisional patent application No. 62/620,102 filed Jan. 22, 2018 and European patent application number 18 158 003.6 filed Feb. 22, 2018. The content of these applications are incorporated herein by reference in their entireties.

The invention relates to an insulating glazing, in particular a triple glazing or a multiple glazing, and a window with such an insulating glazing. The invention further relates to a method for producing such an insulating glazing or such a window.

Insulating glazings usually comprise at least two pane elements and a circumferential spacer frame arranged between these pane elements. The pane elements are connected to the spacer frame via seals such that a tightly sealed interpane space is created. This interpane space is so tight that, ideally, no moisture can penetrate, and if there is a gas filling, ideally, no gas filling can escape.

So-called active glazings or functional glazings offer the possibility of realizing illuminated glazings, glazings with electrical sun screens or blinds, or switchable glazings, including glazings with zones differently or separately switchable, or the like. In the case of an active glazing or functional glazing in the form of an insulating glazing, functional coatings or units can be arranged in the interpane space such that they are protected against moisture and corrosion thanks to the sealing of the inner interpane space.

Usually, a large number of current-carrying conductors are required to be able to provide a suitable power supply for such glazings. These current conductors are routed through the seals of the insulating glazings or windows.

The preparation and arrangement of the current conductors is done manually and thus requires time-consuming and cost-intensive production of the insulating glazings or windows. Since the numerous current conductors must be routed through the seals, numerous possible defect points for liquid and gas leaks are also created.

Active glazings contain a functional element, which typically contains an active layer between two surface electrodes. The optical properties of the active layer can be changed by voltage applied to the surface electrodes. Electrochromic elements, known, for example, from US 20120026573 A1 and WO 2012007334 A1 are an example of this. SPD elements (suspended particle device), known, for example, from EP 0876608 B1 and WO 2011033313 A1 are another example. The transmittance of visible light through electrochromic or SPD elements can be controlled by the voltage applied. The voltage is applied via so-called busbars that are usually applied on the surface electrodes and are connected to a voltage source via suitable connecting cables.

In an insulating glazing with active glazing, the voltage feed must be designed gas- and water-tight in order to ensure sufficient quality and service life of the insulating glazing. In WO 2017/106458 A1, the electrical feed line itself is designed in shape and size such that it has higher tolerance against relative movements in the event of different thermal expansion of the components involved. However, the feed line itself is made between the spacer and the adjacent pane through the primary sealant used for bonding and sealing. Such cable routing through the edge seal of the insulating glazing also always constitutes a potential defect point.

The object of the invention is thus to provide an insulating glazing that enables simple and economical assembly of the glazing and can provide improved tightness. A further object of the invention is to specify a suitable window and a method for its production.

The object of the present invention is accomplished according to the invention by an insulating glazing and a window according to the independent claims 1 and 11. A method according to the invention for production of such an insulating glazing or such a window is specified in claim 12. Advantageous embodiments and further developments emerge from the dependent claims and from the description with reference to the figures.

The insulating glazing according to the invention, in particular a triple glazing or a multiple glazing, is provided with at least one first pane element, at least one spacer, and at least one connector, with the spacer and the connector arranged next to each other such that they extend along a common longitudinal axis and form a receiving groove, and wherein the first pane element is accommodated and positioned in the receiving groove. An electrically conductive coupling element is provided in the receiving groove of the connector such that an electrical coupling can be established between the connector and the first pane element for electrically connecting an external power source to the first pane element.

The invention is based on the idea of specifically supplying a functional glazing or active glazing with electrical energy. By means of at least one connector, the introduction of electrical energy can be provided at specific points of the insulating glazing all the way to the functional pane.

In particular, a uniform power supply is intended to be achieved along the entire surface of the functional pane element by means of the connectors. Thus, provision is made not only to reduce the effort required for producing the insulating glazing or a window with insulating glazing or active glazing, but also to optimize the tightness of the insulating glazing.

"Coupled" preferably means electrically connected galvanically, capacitively, or inductively.

In this context, the insulating glazing according to the invention is provided with at least one first pane element, at least one spacer, and at least one connector, with the spacer and the connector arranged next to each other such that they extend along a common longitudinal axis and form a receiving groove. The first pane element is accommodated and positioned in the receiving groove.

The first pane element is designed in particular as an electrically active or activatable pane element of the insulating glazing or of the window. For example, the first pane element can be an electrochromic pane element, a liquid crystal pane element, a display in the form of a TFT or LCD screen, a pane element with an electrically conductive coating for achieving a heating effect, or the like, in order to provide an electrically active or activatable pane element.

The spacer can be designed in particular as a commercially available spacer for insulating glazings or window frames. Thus, the at least one first pane element is arranged on or in the spacer.

Furthermore, the spacer can comprise a material such as stainless steel, aluminum, plastic, or a comparable material or a comparable combination of materials. In this context, the at least one spacer of the insulating glazing according to the invention can be designed as a commercially available spacer.

The insulating glazing according to the invention is intended to be used with a suitable window frame.

Alternatively, in the context of the present invention, provision can be made to use the insulating glazing according to the invention with a façade or a suitable façade element.

Such a window frame is preferably provided such that it suitably surrounds the insulating glazing with the at least one first pane element.

In particular, the insulating glazing or the window frame can be used with an insulating glazing according to the invention for a window.

Preferably, the at least one spacer is provided along an edge region or a side edge of the first pane element. A plurality of spacers can be provided along one side edge of an insulating glazing. Provision is also made for one or a plurality of spacers to be arranged along all side edges of the insulating glazing.

A spacer and a connector are arranged next to each other along a common longitudinal axis, i.e., are provided one after another in the longitudinal direction. In this context, the cross-sectional surfaces of the spacer and of the connector are joined to one another.

Provision is preferably made for a connector to be placed between two spacers along a side edge of a pane element.

Alternatively, a connector can be directly connected to a so-called corner element or corner connector in the context of the present invention. Preferably, such corner connectors are also to be considered as a development of a spacer.

In particular, provision can be made along a side edge of a first pane element for any plurality of connectors and a corresponding plurality of spacers to be arranged alternatingly next to each other.

The spacers and the connectors are designed such that the first pane element can be accommodated and positioned.

If additional pane elements, in particular a second and a third pane element are provided, the individual pane elements of the insulating glazing or the window are appropriately positioned relative to one another by means of the at least one spacer and the at least one connector.

In the context of a window with insulating glazing or triple/multiple glazing or active glazing, provision is made for spacers to be arranged along all side edges of the pane elements. In particular, at a lower side edge and/or the upper side edge of the pane elements, in use as intended, at least one connector placed between two spacers can be provided in each case.

A connector can have a length comparable to a spacer or can be substantially shorter. The dimension of an individual connector can be freely selected depending on the specific application.

The at least one spacer as well as the connector are used for spacing between the first pane element and at least one additional, second pane element.

The second pane element is likewise arranged along the at least one spacer and the at least one connector, preferably on an opposite side.

Alternatively, in the context of a triple glazing, a first, second, and third pane element can be provided along the spacer and the connector, with the second and third pane element arranged to the side of the spacer and the connector, respectively.

Moreover, the device according to the invention can also be provided as a multiple glazing with a corresponding number of pane elements.

In particular, provision is made for being able to establish a connection to external current conductors or cable connections of an external power source via the connector.

In the context of the present invention, "an external power source" can mean in particular a current or voltage source, a battery, a solar cell, a Peltier element, or the like. Thus, "external power source" means any type of source of electrical current that is sufficient to supply a functional glazing or active glazing with sufficient voltage as required.

Thus, an advantageous reduction of external electrical connections can be achieved, while any desired distribution of the electrical potential or different electrical potentials is possible within the insulated glazing.

By means of the at least one connector, along one side edge of the first pane element, the selective and uniform transmission of electrical energy is advantageously available in order to be able to provide an active or functional glazing. A seal of the insulating glazing is penetrated exclusively in the region of the at least one connector such that the tightness of the system is ensured. Moreover, by using the dedicated current coupling along the at least one connector, the effort required for producing an active glazing or a functional glazing is reduced.

In general, the insulating glazing according to the invention is connected to a window frame, wherein the window frame can be provided in direct contact with or at a distance from the insulating glazing, to form an air gap.

In the context of the insulating glazing according to the invention, an electrically conductive coupling element is provided at least partially in the receiving groove of the connector such that an electrical coupling can be established between the connector and the first pane element for electrically connecting an external power source to the first pane element.

Alternatively, an electrically conductive coupling element is provided at least partially in the receiving groove of the connector and the spacer such that an electrical coupling can be established between the connector and the first pane element for electrically connecting an external power source to the first pane element.

The coupling element is arranged in the receiving groove such that an electrical coupling between the connector and the first pane element is possible within the receiving groove. Using the coupling element, optimum electrical transmission or transmission resistance between the connector and the first pane element is provided, in particular with minimal electrical resistance.

In particular, by means of the coupling element, surface contact between the connector and the first pane element is available such that minimal electrical transmission resistance can be achieved.

The coupling element can preferably comprise an electrically conductive silicone, an electrically conductive thermoplastic elastomer, preferably an electrically conductive thermoplastic polyurethane, or a comparable material. Thus, an economical electrical coupling of the connector to the first pane element is available. Preferably, the coupling element is made, at least in sections, of an electrically conductive silicone, an electrically conductive thermoplastic elastomer, preferably an electrically conductive thermoplastic polyurethane, or a comparable material.

Alternatively, the coupling element can be an electrically conductive silver paste or the like.

Thus, an advantageous electrical coupling of the connector to the first pane element is available.

Preferably, the coupling element comprises a flexible material such that surface contact can be established between the first pane element and the connector via the coupling element.

Preferably, the coupling element extends along the side edge of the pane element over at least a part of the pane element such that an electrical potential can be uniformly transmitted from the connector to the pane element via the coupling element.

In particular, compared to a point-wise introduction of an electrical potential, a suitable distribution of the electrical potential over a larger area of the first pane element is possible by means of the coupling element.

A surface contact is a direct area-wise contact between the coupling element and the first pane element, which extends over an area of at least 3 mm², preferably over an area of at least 10 mm². Preferably, the contact extends along the longitudinal axis (X) within the connector over a distance of at least 5 mm, preferably over a distance of at least 10 mm.

In particular, in the case of an insulating glazing according to the invention for a triple glazing, the spacer and the connector are designed such that a first, second, and third pane element can be accommodated and positioned relative to one another.

For this purpose, the spacer and the connector preferably have, in each case, a receiving groove, which, in the connected state, are aligned with one another along the common longitudinal axis. Thus, the first pane element can be accommodated within the receiving groove of the at least one spacer and the at least one connector.

In the case of a multiple glazing, the spacer and the connector are preferably provided with a corresponding plurality of receiving grooves.

Furthermore, provision can be made for the coupling element in the receiving groove to act at least partially as a damping material for supporting the first pane element in order to damp vibrations or the like. Such a damping effect can be achieved, for example, by a thermoplastic elastomer.

In the context of the invention, the damping effect must be provided by an electrically conductive material of the coupling element.

The second pane element as well as the third pane element are, in this case of a triple glazing, preferably provided along the opposite outer sides of the spacer and the connector.

In the assembled state as intended for use, the second pane element can be regarded as an inner pane of the insulating glazing, whereas the third pane element can be an outer pane.

Thus, by means of one or a plurality of spacers as well as one or a plurality of connectors arranged therebetween, a suitable positioning of the pane elements for a window with the insulating glazing according to the invention, in particular for a triple glazed window, can be done.

According to one embodiment, provision is made for the connector to be an electrically conductive connector.

In particular, the connector can comprise, at least partially, an electrically conductive material. Thus, electrical energy can be transmitted via the connector to the first pane element.

Alternatively, the connector can be designed partially with an electrically conductive coating such that electrical energy from outside can be coupled in and can be expediently transmitted via the connector all the way to the first pane element.

Provision can be made to provide such an electrically conductive coating on the connector during the course of a laser patterning process, an adhesive process, a sputtering process, 3D printing, a coextrusion process, a combined metal/plastic injection molding process, or during the course of a comparable process.

Furthermore, such production processes are also conceivable for a connector comprising, at least partially, an electrically conductive material.

By means of the connector, which comprises, at least partially, an electrically conductive material, an electrical potential can be forwarded via the connector all the way into the receiving groove and can be coupled onto the first pane element by means of the coupling element.

In another embodiment, the connector is not an electrically conductive connector, but, rather, an electrically insulating connector. Preferably, the connector is manufactured from an electrically insulating material, such as, a non-conductive plastic. In this case, a recess through which an external current conductor can be routed is provided in the connector. Thus, the coupling element of the connector can be contacted directly to provide an electrical connection of an external power source to the first pane element.

Preferably, the recess is arranged in the region of the coupling element, preferably in the region of the receiving groove. The recess can have various shapes and can be implemented, for example, as a rounded, angular, elongated recess or an opening in a wall of the connector. The recess is introduced into the wall of the connector in a suitable manner and can, for example, be drilled, milled, or cut into the wall of the connector or can already be provided at the time of the manufacture of the connector.

The recess preferably has an elongated shape and preferably extends substantially in the longitudinal direction of the connector. Preferably, it is implemented as an incision into the connector. This enables particularly simple production and particularly easy insertion of the current conductors by simply pushing them into the recess from the side.

Particularly preferably, at least one current conductor is already routed through the at least one recess of the connector during production of the connector. This can be achieved particularly easily during an extrusion process or during an injection molding process. The tightness of such a component is particularly high.

According to another embodiment, the coupling element extends along that part of the first pane element that is accommodated in the receiving groove of the spacer and/or of the connector.

Preferably, the at least one coupling element extends along the functional first pane element such that the coupling element is concealed in the receiving groove of the spacer or connector. In particular, the coupling element can be provided immediately along the side edge of the first pane element.

Advantageously, the coupling element or the electrical coupling of the first pane element to the connector is not visible from the outside. Thus, an aesthetic overall impression can be achieved by means of the insulating glazing according to the invention, in particular within a window.

Furthermore, the coupling element can be an electrically conductive coupling element over its entire longitudinal extension. Alternatively, the coupling element can be designed to be electrically conductive in sections, in particular along the at least one connector.

Preferably, the coupling element is provided in one piece. Alternatively, the coupling element can be designed in multiple pieces.

In particular, if the coupling element is designed to be electrically conductive in sections, the coupling element can have an additional conductor. The additional conductor can be arranged as an electrically conductive wire within the coupling element such that an electrical potential can be transmitted or forwarded in the longitudinal direction of the coupling element. The wire is preferably a metal wire, particularly preferably made of copper or tungsten or alloys thereof.

Advantageously, this means that an electrical potential from one conductor can be uniformly distributed along the one-piece or multi-piece coupling element and can be expediently coupled onto the first pane element. In particular, this is useful when the resistance of the coupling element is higher than that of the additional conductor.

In one embodiment, the connector has a cross-sectional structure of the spacer.

The connector and the spacer differ in their function in that the connector additionally serves to provide an electrical connection between an external power source and the first pane element.

Consequently, the connector has a comparable or substantially identical cross-sectional structure compared to the at least one spacer. In particular, the outlines of a cross-section of the connector and of the spacer are preferably congruent to ensure a suitable connection between the spacer and the connector.

According to another embodiment, at least one plug connector is provided for the non-positive and/or positive connection of the spacer to the connector.

In particular, the at least one spacer can be connected to the at least one connector by means of at least one plug connector.

Since spacers and connectors can be connected non-positively and/or positively by means of at least one plug connector in each case, a secure assembly of the pane elements of the insulating glazing can be provided.

In one embodiment, the basic structure of the spacer and the connector has in each case at least one hollow space for accommodating the plug connector.

In particular, the spacer and the connector can be implemented in each case as a hollow structure. Thus, the plug connector can be inserted into the hollow spaces of the spacer and the connector to provide a non-positive and/or positive connection.

The plug connector can be a conventional plug connector suitable for connecting commercially available spacers.

Alternatively, the at least one plug connector can form a fixed unit with a spacer.

In another embodiment, the at least one plug connector forms a fixed unit with a connector. Thus, less assembly effort is required for producing an insulating glazing according to the invention or a window according to the invention or a corresponding façade. Preferably, the basic structure of the spacer includes at least one hollow space and the connector includes at least one insertion leg that can be introduced into the hollow space of the spacer. Preferably, insertion legs that can be introduced into at least one hollow space of the spacer are arranged on both sides of the connector, in particular, fixedly connected to the connector in order to establish a non-positive and/or positive connection. Thus, less assembly effort and material outlay is required.

Multiple spacers with connectors positioned therebetween can advantageously be connected to form an insulating glazing according to the invention for a window frame or a window.

According to another embodiment, a first sealing component and a second sealing component are provided along the connector such that an external electrical line from the connector to an external power source extends exclusively through the second sealing component. The first sealing component and the second sealing component are preferably each implemented in one piece.

Preferably, for connecting to the at least partially electrically conductive connector, only the second sealing component on the direct shortest path has to be penetrated. Thus, an external electrical line can be connected to the connector to supply the connector with an electrical potential.

Alternatively, the connector can have a plurality of electrically conductive zones, with each zone connected to a different external current conductor in order to be able to transmit different potentials within the receiving groove to the first pane element.

Moreover, multiple connectors can be provided for the insulating glazing according to the invention, which are in each case subjected to different electrical voltages or potentials.

Since only the second sealing component has to be penetrated for the coupling of an electrical potential onto the at least one connector, optimized tightness of the insulating glazing can be provided.

The first sealing component is preferably provided for bonding the pane elements at the outer sides of the spacer and the connector. In this context, first sealing components are arranged in each case on the two outer sides of the spacer or connector.

The first sealing component can be a butyl sealing component or the like.

In particular, the at least one first sealing component can be provided unaffected by the electrical coupling of the first pane element and preferably in one piece as a continuous seal.

The second sealing component is preferably provided for sealing the insulating glazing relative to a window frame. In particular, the window frame can be spaced apart from the second sealing component, for example, to form an air gap. Thus, the second sealing component is provided along one side of the spacer or the connector that faces away from the space between the pane elements.

The second sealing component can be made of polyurethane, polysulfide, silicone, or the like.

Preferably, the first sealing component and the second sealing component are formed in one piece along one side edge of one pane element. Consequently, the first and second sealing components preferably extend over the spacers and connectors connected to one another along the entire length of the respective side edges of the pane elements.

In the case of a triple glazing, two first sealing elements are provided, preferably formed in one piece along the side edges of the second and third pane elements respectively.

In the region of the at least one connector, the second sealing component is penetrated or passed through at least once in order to be able to provide an electrical connection to an external power source by means of the connector.

In particular, provision is made for only the second sealing component to be penetrated in the region of the connector only by the at least one external current conductor or current cable. Since only the second sealing component is passed through in the region of the connector by a current conductor, the connector ensures an electrical connection of a first pane element without penetration of the first seal being necessary. This substantially improves the tightness of the insulating glazing compared to prior art glazings in which the electrical connection is made with penetration of the first and second seals.

Preferably, provision can be made for the at least one external current conductor or current cable to be cast in the second sealing component or molded with the second sealing component.

Thus, the tightness of the insulating glazing, in particular of the interpane spaces between the pane elements is ensured. In addition, the effort required for producing and electrically connecting the insulating glazing is reduced.

A coordinate aspect of the invention provides a window, in particular an insulating glazed window, a triple glazed, or multi-glazed window with an insulating glazing according to the invention.

Alternatively, the window can be provided as a façade or a façade element.

For example, a façade or a façade element, in particular an insulating glazed façade element, a triple glazed or multi-glazed façade element can be provided with an insulating glazing according to the invention.

Using at least one connector, preferably placed between two spacers, an electrical connection to the functional first pane element can be provided, wherein optimized gas- and liquid-tightness of the window as well as reduced labor and cost outlays for producing the window according to the invention are likewise achieved.

Another coordinate aspect provides a method for producing an insulating glazing according to the invention. The coupling element is introduced into the receiving groove of the connector and/or the spacer before the pane element is inserted into the receiving groove.

In particular, the coupling element can be introduced along a partial length of the receiving groove of the connector and/or of the spacer.

Since the coupling element comprises a flexible material, for example, a silver paste or a flexible electrically conductive polymer, elastic and/or plastic deformation of the coupling element is available when the second pane element is inserted.

Based on such deformation, the coupling element is brought into surface contact with the receiving groove of the connector and the first pane element. The electrical coupling between the connector and the first pane element occurs along the receiving groove via this surface contact of coupling element.

When, during the production process, the coupling element is merely introduced into the receiving groove of the at least one spacer, surface contact with the connector or the receiving groove of the connector can be achieved in the course of the insertion of the first pane element due to the deformation of the coupling element along the receiving groove.

According to one embodiment, provision is made for the coupling element to be introduced into the receiving groove of the spacer and/or of the connector immediately before the insertion of the first pane element, immediately after the joining of the at least one spacer and the at least one connector, or during the extrusion of the spacer.

Thus, various options are available for suitable manufacturing processes for obtaining an insulating glazing according to the invention or a window according to the invention.

Both continuous introduction of the coupling element into the continuously extruded spacer profile and manual introduction into the assembled receiving groove of the spacer and connector are conceivable.

In particular, in the case of a combination of multiple spacers and connectors with one another, a plurality of coupling elements spatially and electrically separated from one another can, moreover, be arranged in the receiving groove. Thus, either an electrical potential can be uniformly established over an entire surface of the pane element or different electrical potentials can be applied in different zones of the first pane element.

Furthermore, the coupling element can remain in the receiving groove for a longer time and immediate insertion of the first pane element is not absolutely necessary. Instead, the coupling element in the form of an electrically conductive flexible polymer can remain in the receiving groove for a long time before the first pane element is inserted without losing its capacity for elastic/plastic deformation and electrical conductivity.

In summary, the method according to the invention can provide options that are flexible and can be adapted as necessary for producing an insulating glazing according to the invention or a window according to the invention.

The objective is achieved by using the coupling element to be inserted into the receiving groove to establish sufficient electrical contact between the connector and the first pane element.

The invention is explained in the following with reference to the accompanying figures.

Figure 1:
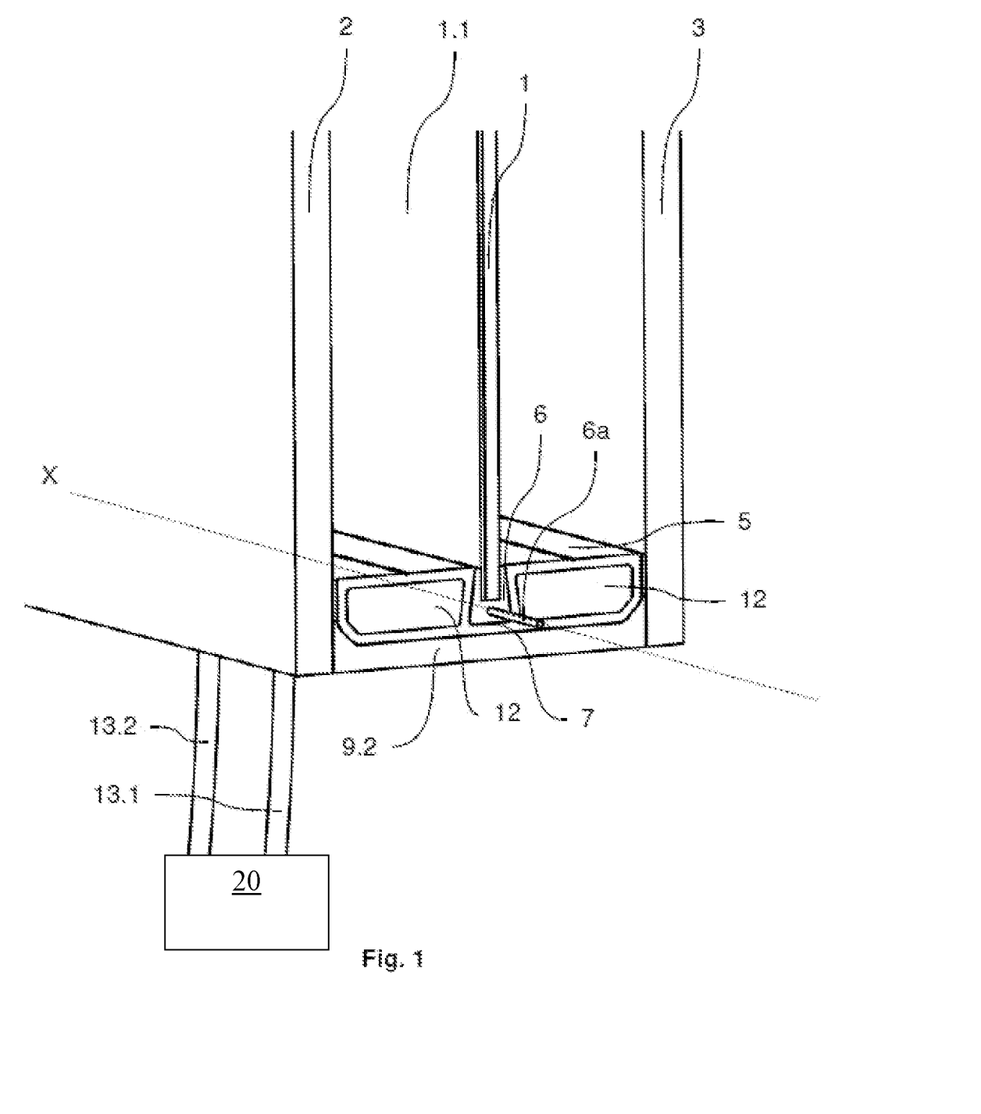
FIG. 1 an overview of an exemplary embodiment of the invention with triple glazing.

Schematically, they depict:

FIG. 1 depicts an overview of an exemplary embodiment of the invention with a triple glazing.

FIG. 1 depicts an overview of a first exemplary embodiment of an insulating glazing, in particular a triple glazing. In particular, the insulating glazing is depicted in a sectional view.

The insulating glazing is shown with a first, second, and third pane element 1; 2; 3. In addition, the insulating glazing has a connector 5. A spacer 4 connected to the connector 5 is not visible in FIG. 1 or is concealed by the second pane element 2.

In this context, the insulating glazing of FIG. 1 is designed as a triple glazing. The connector 5 or the spacer 4 are expediently designed for accommodating the three pane elements 1; 2; 3.

The first pane element 1 is designed according to FIG. 1 with an electrically activatable or active coating on a first pane side 1.1. Thus, the first pane element 1 can be provided as a functional or activatable pane element.

Preferably, the second pane element 2 is an inner pane, whereas the third pane element 3 is an outer pane. The centrally arranged first pane element 1 is implemented as an active or functional pane element.

Preferably, the insulating glazing of FIG. 1 can be an electrochromatic glazing or a liquid crystal glazing, wherein, in particular, the first pane element 1 is the functional pane element.

The second and third pane element 2; 3 are arranged on the outer sides of a spacer 4 or a connector 5. The first pane element 1 is accommodated and positioned in a receiving groove 7 of the spacer 4 or connector 5.

A second sealing component 9.2 that extends along the width of the connector 5 is shown between the connector 5 and the second and third pane element 2, 3. In particular, the second sealing component 9.2 extends along the width of the connector 5 on its side facing away from the first pane element 1.

The second sealing component 9.2 is intended in particular to increase the mechanical stability of the insulating glazing and the sealing of the insulating glazing. The second sealing component 9.2 is preferably implemented in one piece.

In the context of the use of the insulating glazing depicted in FIG. 1, it is intended for the insulating glazing to be expediently surrounded by a window frame. Thus, the window frame can be connected to the second sealing component 9.2 or preferably provided at a distance from the second sealing component 9.2.

In addition, FIG. 1 shows two external current conductors or external cables 13.1; 13.2 that extend in the direction of the connector 5. In particular, the external current conductors 13.1; 13.2 are provided to connect the insulating glazing to an external power source 20 for transmitting electrical energy.

Figure 2:
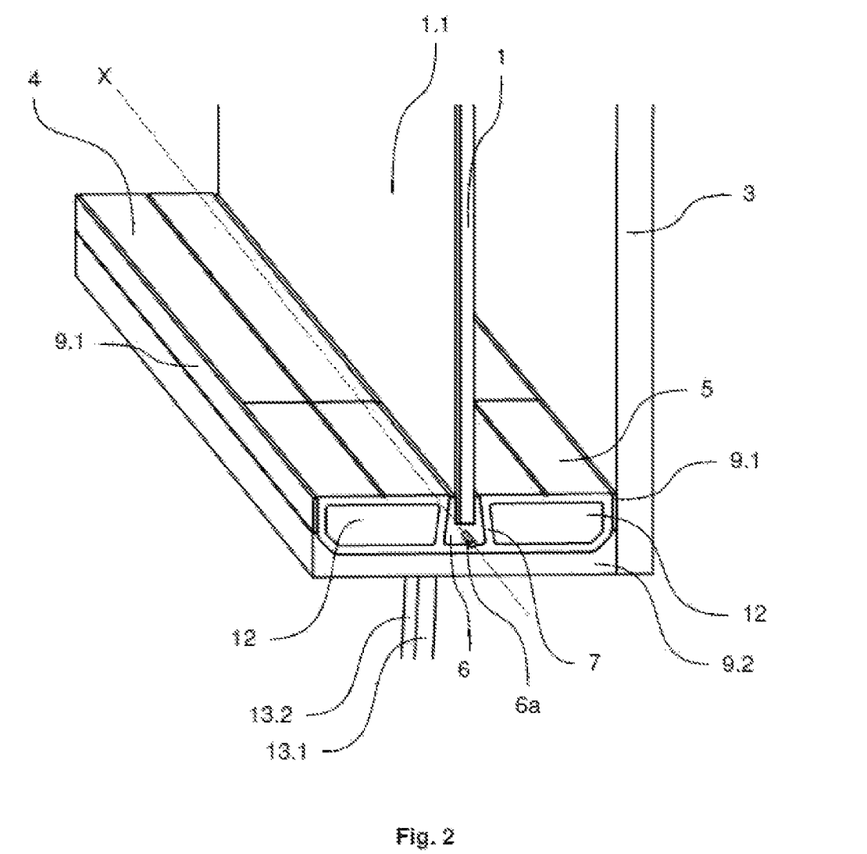
FIG. 2 an isometric front view of the exemplary embodiment of FIG. 1.

FIG. 2 is an enlarged isometric front view of the first exemplary embodiment of the insulating glazing of FIG. 1.

The connector 5 is connected to a spacer 4. The connection is preferably done by means of plug-in connectors (not shown in FIG. 2) that are inserted into hollow spaces 12 of the spacer 4 and the connector 5.

In the context of FIG. 2, the insulating glazing can have one or a plurality of connectors 5 along a side edge of the first pane element 1, which are in each case individually placed between spacers 4.

According to FIG. 2, the third pane element 3 or the second pane element 2 is provided on side surfaces of the connector 5 or of the spacer 4. The second and third pane element 2; 3 respectively are bonded with a first sealing component 9.1 along the side surfaces of the connector 5 and the spacer 4.

The first sealing component 9.1 can be a butyl bond or a butyl seal.

The second sealing component 9.2 is provided between the second and third pane element 2; 3 across the width of the connector 5 or the spacer 4. The second sealing component 9.2 is intended in particular to increase the mechanical stability of the insulating glazing and the sealing of the insulating glazing.

The first pane element 1 is arranged in a receiving groove 7, which is formed by the spacer 4 and the connector 5 along a common longitudinal axis X. The receiving groove 7 is substantially U-shaped or similarly shaped.

A coupling element 6 is provided within the receiving groove 7 such that the connector 5 can be coupled to the first pane element 1, and the coupling element 6 preferably contributes to damping of movements of the first pane element 1 beiträgt.

In this context, provision is preferably made for the first pane element 1 and the coupling element 6 to substantially fill the receiving groove 7 in the intended state of use. Thus, improved electrical coupling is possible with low electrical resistance.

The coupling element 6 can be electrically conductive along its entire length in the receiving groove 7.

Alternatively, the coupling element 6 can be electrically conductive along its length in the receiving groove 7, in particular in the region of the connector 5.

Figure 3:
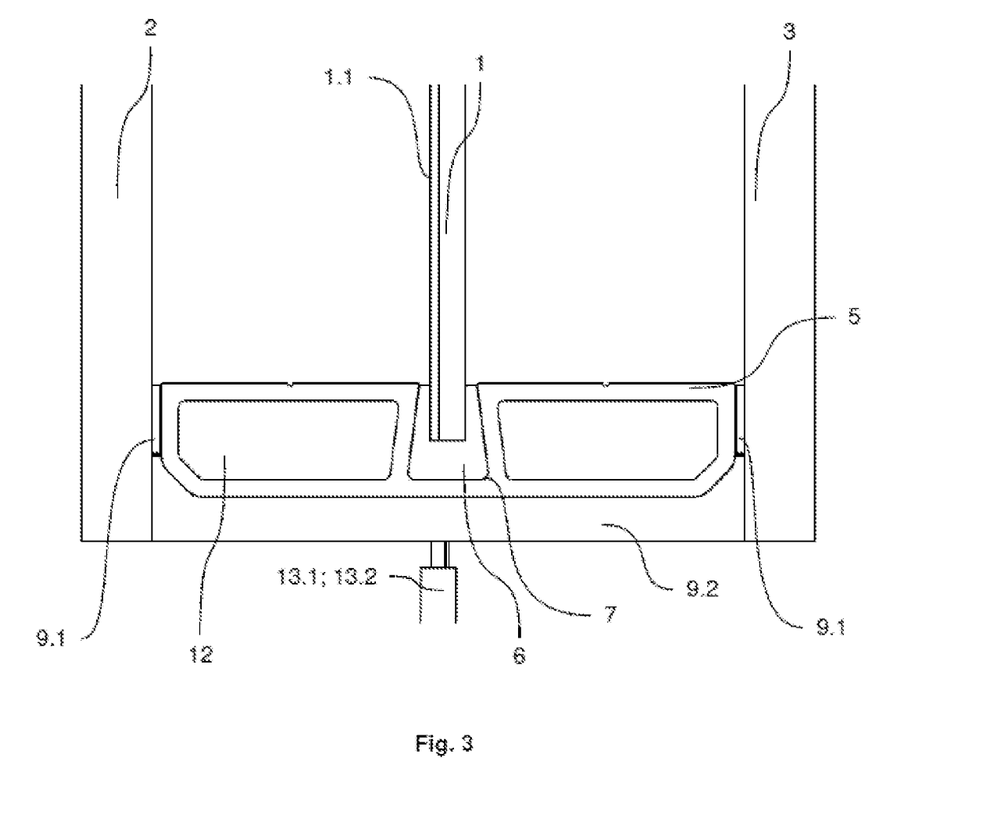
FIG. 3 a sectional view of the exemplary embodiment of FIG. 1.

According to FIG. 1 through 3, the coupling element 6 has the additional conductor 6*a* to provide transmission of an electrical potential along the receiving groove 7 between the connector 5 and the spacer 4. Thus, uniform distribution or uniform transfer of an electrical potential can be achieved, preferably over the entire extension of the first pane element 1. This is, in particular, useful when the resistance of the coupling element is higher than that of the additional conductor.

Preferably, the coupling element 6 is provided without the additional wire or the additional conductor 6*a*.

In particular, the coupling element 6 is arranged along that part of the first pane element 1 that is situated in the receiving groove 7 of the connector 5 or the spacer 4.

Thus, an aesthetic external overall impression can be achieved, making it possible to dispense with a black print coating as a screen, e.g., along the second and/or third pane element 2; 3 or along the pane side of the first pane element 1 opposite the first pane side 1.1.

Preferably, the coupling element 6 extends within the receiving groove 7 on both sides of the first pane element 1.

The coupling element 6 is provided such that there is direct and immediate coupling with the first pane element 1. No further contacting elements along the first pane element 1 are necessary to provide a suitable electrical coupling between the at least one connector 5 and the first pane element 1.

Furthermore, by means of coupling element 6, simultaneous contacting is available on both sides of the first pane element 1.

Furthermore, a plurality of coupling elements 6 can be arranged along the receiving groove 7 spatially and thus electrically separated from one another. It is conceivable, for example, by using a plurality of connectors 5 to be able to divide the first pane element 1 into zones that can be controlled together or separately.

Since the various coupling elements 6 are electrically connected to different connectors 5, the first pane element 1 can be subjected, as needed, via the connectors to different electrical potentials or to the same electrical potential. Different functions of the activatable pane or of the functional first pane element 1 can be implemented as a function of the electrical voltage applied along the multiple coupling elements 6.

In order to connect the at least one connector 5 to an external power source, external current conductors or current cables 13.1; 13.2 pass exclusively through the second sealing component 9.2. Preferably, the external current cables 13.1; 13.2 penetrate the second sealing component 9.2 by the shortest route for connecting to the connector.

The first sealing component 9.1 is not penetrated by the at least one external electrical current conductor 13.1; 13.2 or any other electrical coupling of the connector 5 to an external power source.

It is conceivable that the connector 5 has a recess, for example, in the form of a bore or a groove for at least one external current conductor 13.1; 13.2. This is, in particular, advantageous in connection with a non-conductive connector.

Preferably, the external current conductors 13.1; 13.2 are cast in the second sealing component 9.2 to ensure tightness of the device.

For example, an electrical connection to the first pane element 1 can be established by means of the connector 5.

FIG. 3 depicts the exemplary embodiment of FIG. 1 in a sectional view.

In particular, it is clear that the coupling element 6 surrounds the first pane surface 1 on both sides in order to provide a suitable electrical coupling between the connector 5 and the first pane element 1. Preferably, the coupling element 6 is provided such that surface contact between the connector 5 and the first pane surface 1 can be achieved.

According to FIG. 1 through 3, the receiving groove 7 is arranged substantially centrally or symmetrically to the connector 5 or spacers 4.

Alternatively, the receiving groove 7 can be shifted to one side or implemented asymmetrically. In particular, the connector 5 can be implemented with an asymmetrically arranged receiving groove 7.

Thus, for example, less distance can be provided between the first and second pane element 1; 2 than between the first and third pane element 1; 3. Thus, it is, for example, possible to achieve optimization of the acoustics or the sound damping values.

The coupling element 6 is provided preferably made of a flexible, deformable, electrically conductive material such that the coupling element 6 can expediently substantially fill up the receiving groove 7 between the first pane element 1 and the connector 5.

Furthermore, compared to FIGS. 1 and 2, the coupling element 6 of FIG. 3 is shown without an additional conductor 6a. In this context, provision can be made to be able to establish sufficient coupling of electrical energy or a potential to the first pane element 1 via the connector 5 and the preferably one-piece coupling element 6.

Alternatively, in the case of multiple connectors 5, and in particular in connection with a plurality of coupling elements 6 or one coupling element 6 expediently designed in multiple parts, coupling of different potentials to the first pane element 1 can be provided.

An electrical connection between the at least one connector 5 and the first pane element is provided as needed and expedient.

Since the electrical connection between an external power source or external current cables 13.1; 13.2 and the first pane element 1 is made exclusively via the connector 5, simplified production of the insulating glazing or the window is ensured.

Furthermore, the external current conductors or current cables 13.1; 13.2 only have to be routed a short distance through the second sealing component 9.2 to the at least one connector 5.

In particular, the at least one current conductor 13.1; 13.2 can be cast in the second sealing component 9.2. Thus, advantageously, complete tightness of the insulating glazing can be achieved with the first and second sealing components 9.1; 9.2.

In general, it is advantageously possible to establish an electrical connection between an external power source and the first pane element 1 by means of the insulating glazing according to the invention or a window according to the invention through the use of at least one special connector 5; 5'.

Using the at least one connector 5 and the coupling element 6, an electrical potential can be uniformly introduced on the first pane element 1.

At the same time, improved sealing is ensured along with lower production effort and reduced production costs.

Figure 4:
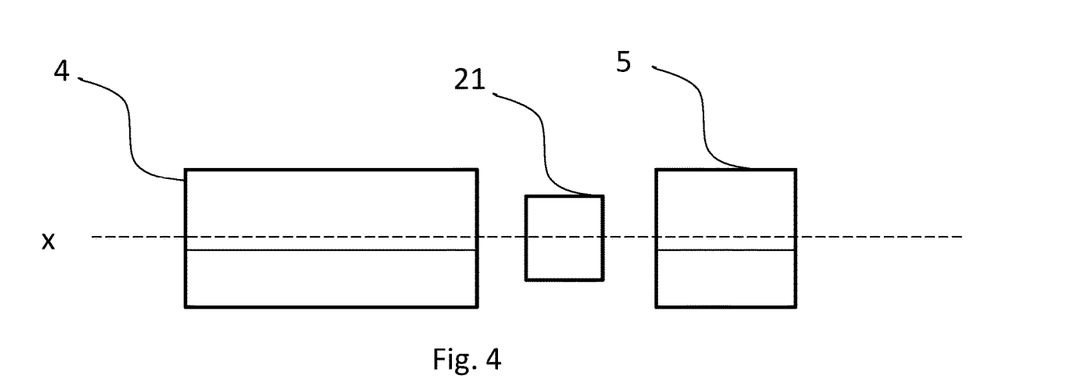
FIG. 4 schematically shows an exploded side view of the spacer, the plug connector and the connector, and FIG. 5 schematically shows an exploded side view of the spacer and the connector, with the connector having an insertion leg.

FIG. 4 schematically shows an exploded side view of the spacer 4, the plug connector 20 and the connector 5. The plug connector 21 can be inserted into the hollow spaces of the spacer 4 and the connector 5 to provide a non-positive and/or positive connection.

Figure 5:
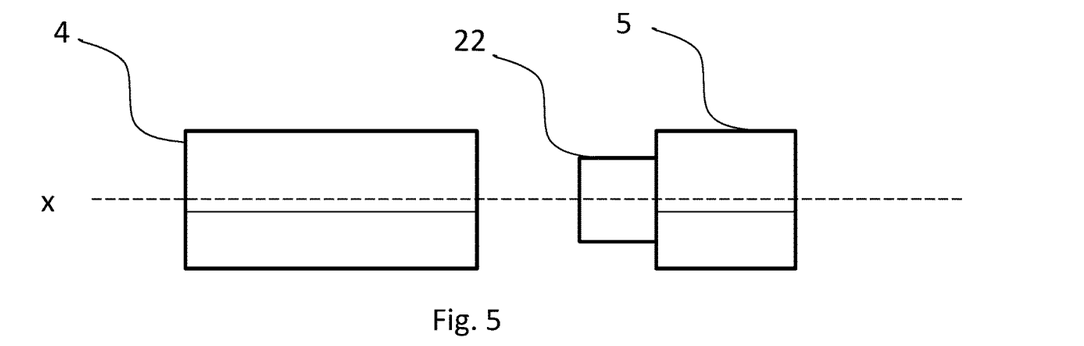

FIG. 5 schematically shows an exploded side view of the spacer 4 and the connector 5, with the connector 5 having an insertion leg 22. The insertion leg 22 can be introduced into the hollow space of the spacer 4.

LIST OF REFERENCE CHARACTERS 1 first pane element
1.1 first pane side of the first pane element
2 second pane element
3 third pane element
4 spacer
5 connector
6 coupling element
6a additional conductor
7 receiving groove
9.1 first sealing component
9.2 second sealing component
12 hollow space
13.1 external current conductor
13.2 external current conductor
X longitudinal axis

The invention claimed is:

1. An insulating glazing comprising at least one first pane element, at least one spacer, and at least one connector, wherein the spacer and the connector are arranged next to each other such that the spacer and the connector extend along a common longitudinal axis and form a receiving groove, wherein the first pane element is accommodated and positioned in the receiving groove, wherein an electrically conductive coupling element is provided in the receiving groove of the connector such that an electrical coupling can be established between the connector and the first pane element for electrically connecting an external power source to the first pane element, wherein
    (i) the connector is an electrically conductive connector, or
    (ii) the connector is an electrically insulating connector and the connector includes at least one recess, through which at least one external current conductor can be routed.

2. The insulating glazing according to claim 1, wherein the coupling element is made of a flexible material such that a surface contact can be established between the connector and the first pane element.

3. The insulating glazing according to claim 1, wherein the coupling element is made, at least in sections, of an electrically conductive silicone or of an electrically conductive thermoplastic polyurethane.

4. The insulating glazing according to claim 1, wherein the coupling element is designed to be electrically conductive in sections and has an additional conductor.

5. The insulating glazing according to claim 4, wherein the additional conductor is in the form of an electrically conductive wire within the coupling element.

6. The insulating glazing according to claim 1, wherein the coupling element extends along that part of the first pane element that is accommodated in the receiving groove.

7. The insulating glazing according to claim 1, wherein the connector and the spacer have a same cross-section perpendicular to the common longitudinal axis.

8. The insulating glazing according to claim 1, wherein at least one plug connector is provided for the non-positive and/or positive connection of the spacer to the connector.

9. The insulating glazing according to claim 8, wherein a basic structure of the spacer and of the connector has in each case at least one hollow space-for accommodating the plug connector.

10. The insulating glazing according to claim 1, wherein the connector includes at least one insertion leg and a basic structure of the spacer includes at least one hollow space suitable for accommodating the insertion leg for producing a non-positive and/or positive connection.

11. The insulating glazing according to claim 1, wherein a first sealing component and a second sealing component are provided along the connector such that an external electrical line extends from the connector to an external power source exclusively through the second sealing component.

12. A window with insulating glazing according to claim 1.

13. The insulating glazing according to claim 1, wherein the insulating glazing is a triple glazing or a multiple glazing.

14. A method for producing an insulating glazing that includes at least one first pane element, at least one spacer, and at least one connector, wherein the spacer and the connector are arranged next to each other such that the spacer and the connector extend along a common longitudinal axis and form a receiving groove, wherein the first pane element is accommodated and positioned in the receiving groove, wherein an electrically conductive coupling element is provided in the receiving groove of the connector such that an electrical coupling can be established between the connector and the first pane element for electrically connecting an external power source to the first pane element, wherein
   (i) the connector is an electrically conductive connector, or
   (ii) the connector is an electrically insulating connector and the connector includes at least one recess, through which at least one external current conductor can be routed,
the method comprising introducing the coupling element into the receiving groove before the at least one first pane element is inserted into the receiving groove.

15. The method according to claim 14,
wherein the coupling element is introduced into the receiving groove immediately before the insertion of the at least one first pane element, immediately after the joining of the at least one spacer and the at least one connector, or during the extrusion of the spacer.

* * * * *